May 1, 1956
C. H. BAINES
2,743,933
AUTOMATIC TEMPERATURE AND PRESSURE CONTROL
CIRCUIT FOR SHEET METAL FORMING TOOLS
Filed Sept. 14, 1953
2 Sheets-Sheet 1
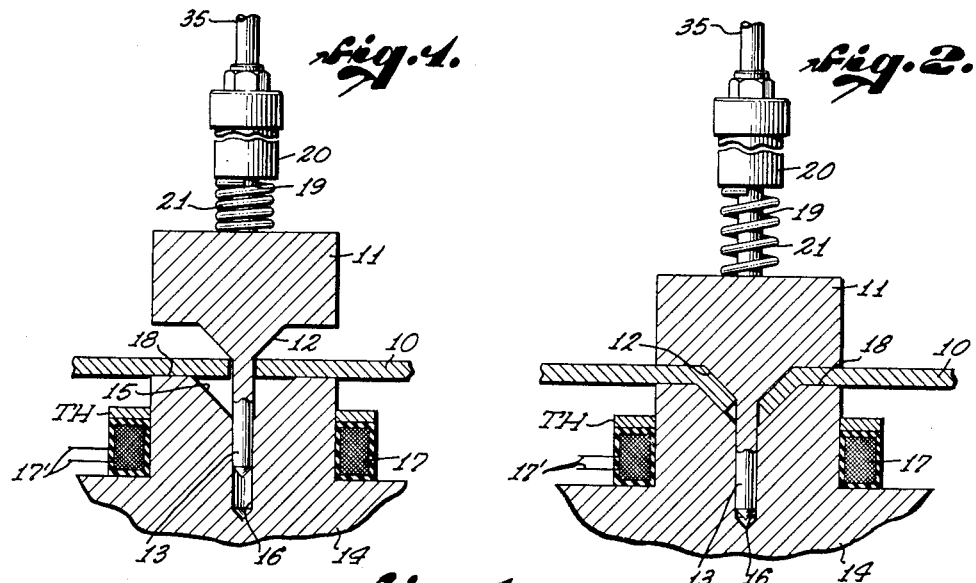
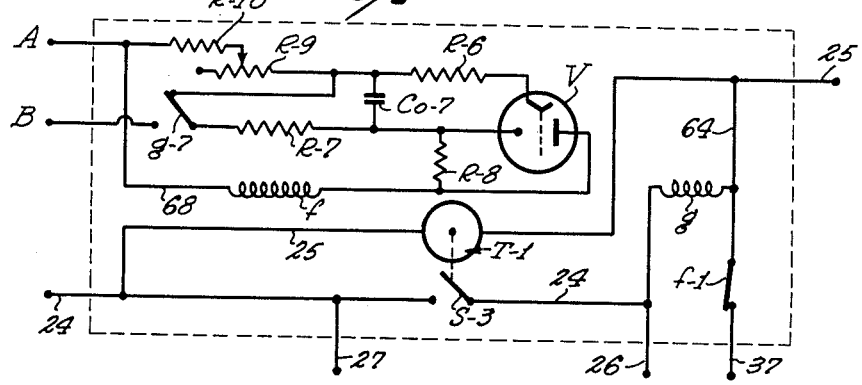
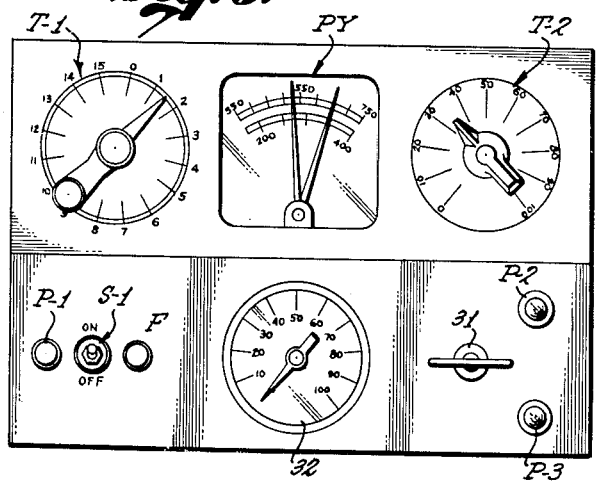
CHARLES H. BAINES,
INVENTOR.
BY George W. Smyth
ATTORNEY.

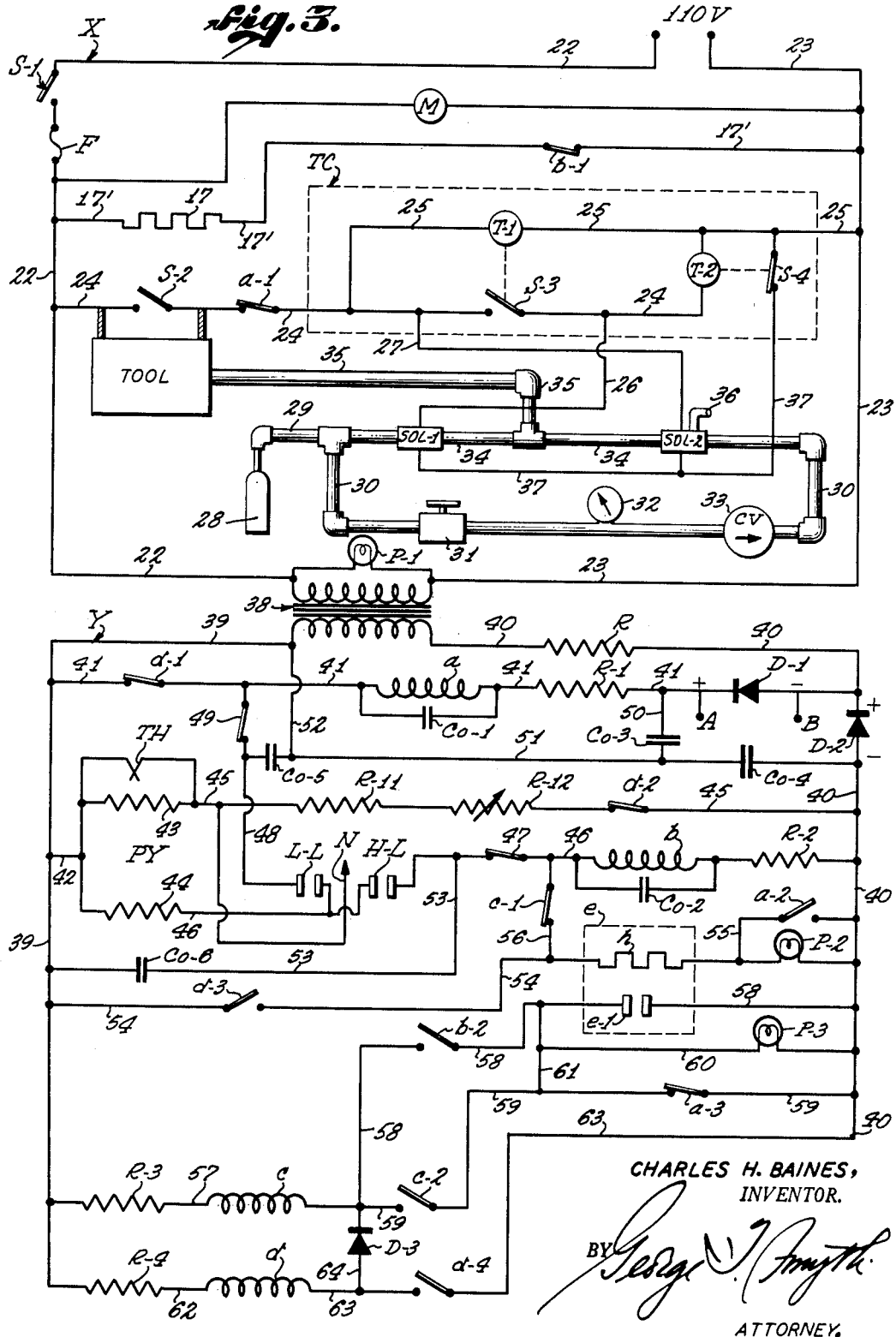

United States Patent Office 2,743,933
Patented May 1, 1956

2,743,933

AUTOMATIC TEMPERATURE AND PRESSURE CONTROL CIRCUIT FOR SHEET METAL FORMING TOOLS

Charles H. Baines, Redondo Beach, Calif., assignor to Harbo Manufacturing Co., Venice, Calif., a copartnership Application September 14, 1953, Serial No. 380,065

10 Claims. (Cl. 219—3)

This invention relates to improved control circuits in tools employed for conditioning metals. More particularly it has to do with means for rendering a tool inoperative automatically if the critical conditions of temperature and pressure are not met for the particular forming operation, thereby preventing costly damage to the metallic sheets being worked and protecting the tool from damage due to uncontrolled temperature variations during the forming operation.

As an illustrative example of the control circuits of the present invention, the preferred embodiment will be described as employed in a dimpling tool for conditioning sheet metal to receive flush rivets. It is to be understood, however, that the circuits are not limited to this type of tool but will find other uses in tools requiring similar controls.

In certain applications of rivets it is highly desirable that the rivets be flush with the surface of the sheet metal through which the rivet is passed. This is particularly true in the aircraft industry where streamlining is of paramount importance. In order that the rivets be flush with the metallic surface, it is customary to first "dimple" the surface, or make a conical type depression in the metal for housing the rivet head. This operation permits the rivet to be properly driven into place, the flat head of the rivet being flush with the sheet metal surface. In some types of sheet metal such as "dural" and titanium alloys used in aircraft construction, such dimpling can cause considerable damage to the sheet unless the metal is pre-heated to a critical amount whereby it is sufficiently malleable to conform to the dimple impression making dies. Further, it is important that a certain pressure be used to effect a proper dimple impression to avoid fracturing or undue thinning of this metallic skin.

One principal difficulty with prior art dimpling tools is that the pre-heating control circuits are not well regulated nor are there any reliable provisions for preventing operation of the tool in the event of failure of the pre-heating system. If the tool is operated under incorrect temperatures or when the metal is cold, the dimple cannot be properly formed and a whole sheet of stock metal is thus wasted. This is not only costly due to the high price of such metals, but also time-wasting and inefficient.

The present invention has as its primary object the provision of a vastly improved type of control circuit for a dimpling tool incorporating several novel safety features for preventing operation of the tool under incorrect temperatures.

More particularly, it is an object of the invention to provide a dimpling tool control circuit in which both the heating means and the tool itself are rendered inoperative in the event the heating system fails or breaks down, making it impossible to dimple the metal in a cold state.

Another object is to provide an improved regulating means for insuring that the proper temperature is maintained throughout the various phases of operation. In this connection the invention provides visual means for indicating when the tool is up to proper temperature and ready to be operated and for indicating when a failure or breakage in the system has occurred.

These and further objects and advantages of the invention are attained by a novel arrangement of relays and circuits for operating a compressed air system and suitable heating coils in a controlled manner to effect the dimpling all as will become clear upon referring to the following detailed description of a preferred embodiment of the invention and to the accompanying drawings in which:

Figure 1 schematically illustrates the dimpling tool in the "dwell" time phase of operation;

Figure 2 shows the position of the tool at the time the dimple is formed;

Figure 3 is a highly schematic circuit diagram showing the control circuits for effecting the dimpling operation;

Figure 4 shows an alternative type of electronic control circuit which may be substituted for one of the control circuits of Figure 3; and Figure 5 shows a front view of the panel of a suitable frame for housing most of the circuitry for the tool.

In Figure 1 there is shown a sheet of metal 10 in which it is desired to make a dimple for housing the head of a rivet to provide a flush surface. The dimpling tool itself may be made portable so that an operator may move it about relatively freely to spaced points along the sheet 10 for rapid dimpling thereof in succession. As shown, the tool comprises a male die member 11 having a conical projection 12 terminating in a pilot 13 adapted to pass through the rivet marking hole in the sheet 10. On the opposite side of the sheet 10 there is provided a mating female die 14 having a mating conical recess 15 and bore 16 for receiving the projection 12 and pilot 13 of the member 11 respectively. The jaws or die members 11 and 14 are thus maintained in proper alignment.

In a preferred construction, the female die member 14 is provided with a heating coil 17 whereby heat may be conducted up through the member to the under surface of the sheet metal 10 to heat this metal uniformly about the rivet opening as at the contacting surfaces 18. Power to the heating coil is provided through leads 17'. Also included adjacent the heater coils is a thermocouple element TH adapted to provide an electrical signal in response to the temperature of the heating coils.

In Figure 2, the first member 11 is shown in mating engagement with the second member 14, the sheet metal 10 having been pressed between the members to form th dimple. This operation may be effected by a piston 19 operating in a cylinder 20 supplied with compressed air through a conduit 35. A tension spring 21 is provided for returning the member 11 to its unengaged position when the compressed air pressure is relieved. The showing in Figures 1 and 2 is purely schematic and the actual construction and arrangement of the piston and cylinder in the pneumatic system may be of any suitable design.

The components of the tool described thus far may be conveniently arranged in a compact unit, the electrical heating coil lines 17', the thermocouple leads (not shown) and the conduit 35 being housed in a suitable flexible sheath and leading to the principal control circuits.

In the dimpling operation, an operating switch on the tool is depressed to actuate suitable control circuits to supply air under a given pressure to the cylinder 20. This pressure will move the member 11 into engagement with the sheet metal 10 and although this given pressure is not sufficient to deform or dimple the sheet member, it is sufficient to bring about pressural engagement of the sheet 10 with the lower member 14 in order that proper preheating of the metal may be had. The members 11 and 14 remain in this "dwell" position for a certain "dwell" time as determined by a timing motor in the control circuits. After the metal 10 is properly preheated, the control circuits are automatically actuated to supply a much higher compressed air pressure to the cylinder 20 and effect the dimpling. The members 11 and 14 are caused to remain in the positions shown in Figure 2 momentarily and then the air pressure is released and the spring 21 returns the member 11 to the unengaged position as hereinbefore explained. The tool is then in condition for making another dimple.

A preferred type of control circuit for effecting the above outlined operations is shown in detail in Figure 3. In this drawing, the circuit is shown as divided into two main sections by a transformer, the upper section being designated generally by the letter X and the lower section by the letter Y. This arrangement is purely for simplifying the description. In general, the upper section X includes the control circuits for applying the compressed air pressure to the tool, while the lower section Y includes the relay coil controls and other circuits for preventing operation of the tool in the event of failure of certain parts.

For further convenience in the description of this diagram, certain components of the tool are shown separated from the tool. Also, relay contacts are shown separated from their actuating relay coils. The relay coils are designated by the letters a, b, c, and d while the respective contacts which they actuate are numbered with a lettered prefix to indentify the actuating relay coil, such as a-1, b-2, etc.

Referring now to Figure 3, a left and right hand power line 22 and 23 are connected to a source of electric power such as a conventional 110 volt A. C. supply as shown at the top of the drawing. Left line 22 includes a main power switch S-1 and a fuse F, and continues downwardly terminating at one terminal of the primary of transformer 38. The right line 23 connects directly to the other terminal of the primary of transformer 38.

Bridging the main line conductors 22 and 23 just after the fuse F is an interrupter motor M the purpose for which will become clear as the description proceeds. Also bridging the main power lines is the heating coil 17 which is located in the tool as shown in Figures 1 and 2. This coil is connected to the lines 22 and 23 by conductors 17' and includes in series therewith relay contacts b-1.

The compressed air control system for operating the tool is electrically actuated through a lead 24 from the left power line 22, switch S-2 located on the tool, relay contacts a-1, and a switch S-3 arranged to be actuated by a timing motor T-1 disposed in a shunting line 25, the lead 25 continuing over to the right power line 23 to which it is connected. Lead 24 also includes a series connected second timing motor T-2 arranged to actuate a second switch S-4. The lead 24 then connects with lead 25 as shown. Branch conductors 26 and 27 are connected between each side of the switch S-3 and solenoid operated valves Sol-1 and Sol-2 respectively in the compressed air control conduits.

The compressed air system itself comprises a source of compressed air 28 having an outlet conduit 29 passing into the solenoid operated valve Sol-1. A branch conduit 30 forks off from conduit 29 before Sol-1, passes through a pressure regulating valve 31, pressure gauge 32, and a check valve 33 to the second solenoid valve Sol-2. The outlet sides of the valves Sol-1 and Sol-2 are connected by a conduit 34. Approximately at the midpoint of the conduit 34 there is provided a T-joint from which the conduit 35 passes to the tool as shown. The solenoid valve Sol-2 is a three-way valve, its third opening comprising an exhaust vent 36. A return electrical lead 37 for the two solenoid valves passes up through the series connected switch S-4 to the lead 25.

In the X section of the circuit of Figure 3 there is provided a pilot light P-1 shunting the primary of transformer 38 for indicating when the switch S-1 is closed.

Referring now to the Y section of the control circuit, the secondary of the transformer 38 connects to left and right power lines 39 and 40. The line 40 includes a series connected current limiting resistance R and thence branches to connect to rectifiers D-1 and D-2. These rectifiers provide D. C. current for operating a pyrometer circuit and the various relay coils. As shown, the rectifier D-1 is connected into a line 41 including in series progressing from right to left, a voltage dropping resistance R-1, relay actuating coil a, shunted by a small condenser Co-1, and thence through relay contacts d-1 to the left power line 39. Following down the left power line 39, there is a branch lead 42 connected to two pyrometer coils shown schematically as 43 and 44 in a pyrometer PY. A main temperature indicating needle N is carried by coils 43 and 44 but is shown separated therefrom to clarify the drawing. The coil 43 is shunted by the thermocouple element TH. The other end of coil 43 is connected to a lead 45 including a fixed resistance R-11 and a variable resistance R-12 in series. From the resistance R-12, line 45 connects to right power line 40 through relay contacts d-2.

The end of the other pyrometer coil 44 connects to a lead 46, high limit pyrometer contacts H-L, interrupter switch 47, relay actuating coil b, and voltage dropping resistance R-2 to the right power line 40. Relay coil b is shunted by a small condenser Co-2. As shown just to the right of the pyrometer PY, there is provided a conductor 48 including a second interrupter switch 49 and low limit pyrometer contacts L-L in series all connected between the conductors 41 and 46.

A branch lead 50 from the right side of resistance R-1 in lead 41 includes a condenser Co-3 and connects to a line 51. Line 51 includes series connected condenser Co-4 and connects at one end to the right power line 40 on the negative side of the rectifier D-2. The other end of line 51 connects to left power line 39 adjacent the secondary of transformer 38 through branch lead 52. A condenser Co-5 is connected between line 51 and the conductor 48 between the interrupter switch 49 and low limit L-L contacts of the pyrometer effectively shunting the low limit L-L contacts and pyrometer coil. The pyrometer coil 44 and high limit contacts H-L are shunted by a condenser Co-6 connected in lead 53 as shown. These condensers prevent sparking at the L-L and H-L contacts.

Continuing on down the left power line 39, a lead 54 passes through relay contacts d-3, heating coil h in a thermal contact control e, and a pilot light P-2 to the right power line 40. The pilot light P-2 is shunted by relay contacts a-2 connected in shunting lead 55. To the left of the heating coil h, a branch lead 56 includes relay contacts c-1 and is connected between the line 54 and the conductor 46.

As shown in the lower left hand corner of the Y section, the relay actuating coil c is connected at one end through a voltage dropping resistance R-3 to the left power line 39 as by conductor 57. The other end of coil c passes into a branch conductor 58, relay contacts b-2, and thermal actuated contacts e-1 to the right power line 40. The other end of coil c is also connected to lead 59 which includes in series, relay contacts c-2 and relay contacts a-3, and thence connects to right power line 40. The thermal contacts e-1 and relay contacts a-3 are shunted by a pilot light P-3 connected in conductor 60, this latter conductor connecting to leads 58 and 59 through lead 61, and to the right power line 40.

Referring again to the lower left hand corner of the Y section, the relay actuating coil d is connected at one end through voltage dropping resistance R-4 to the left power line 39 as by conductor 62. The other end of coil d connects to the right power line 40 through relay contacts d-4 as by a conductor 63. A small rectifier D-3 is provided in a line 64 connected between the conductors 59 and 63 adjacent the ends of the relay coils $c$ and $d$.

The various relay contacts are shown in the positions they assume when their operating relay coils are de-energized.

Operation

In the operation of the dimpling apparatus and the control circuit therefor, the main power switch S–1 shown in the upper left hand corner of Figure 3 is closed starting the interrupter motor M and lighting the pilot light P–1 to indicate that the power is on. Heater 17 is also energized through the normally closed relay contacts $b$–1. This heater will serve to heat the metallic sheet 10 shown in Figure 1 to a proper temperature to place the metal in condition for dimpling. The compressed air system is not energized because of the normally open switch S–2 on the tool, which switch is manually controlled by the operator of the tool.

Closing of the main power switch S–1 will energize the primary of transformer 38 and place power on the secondary lines 39 and 40. Relay coil $a$ in lead 41 will accordingly be energized through the normally closed relay contacts $d$–1, voltage dropping resistance R–1, and rectifier D–1. Energization of relay coil $a$ opens the contacts $a$–1 in lead 24 of section X of the circuit to insure that the tool cannot be operated even though switch S–2 may be inadvertently closed by the operator. The purpose of disconnecting the tool from the circuit in this manner is to give the heating coil 17 a change to come up to proper temperature and thus prevent dimpling of the metal in a cold state. The fact that contacts $d$–1 are closed will insure energization of relay $a$. These contacts shunt the pyrometer coil 44 and L-L contacts whereby the needle N is free to move since the voltage across coil 44 is shunted out. The L-L contacts being normally closed at the start.

When relay coil $a$ is energized, the normally open relay contacts $a$–2 at the middle right hand portion of section Y of the circuit are closed shunting out pilot light P–2 indicating that the tool is not ready to be operated. The contacts $a$–3 at the lower right hand portion of the Y circuit are opened.

After heating coil 17 has attained the proper temperature, the current from thermocouple TH shunting the pyrometer coil 43 in the Y section of the circuit closes the high limit H-L contacts in lead 46. This thermocouple, as shown in Figures 1 and 2, is disposed adjacent the heating coil 17 in the tool and is adapted to close the H-L contacts through current supplied to the pyrometer coil 43 swinging needle N only when a certain predetermined temperature has been reached.

Closing of the H-L contacts applies voltage across pyrometer coil 44 holding the H-L contacts closed and energizes relay coil $b$ in line 46 through the pyrometer coil 44, H-L contacts, interrupter switch 47, and voltage dropping resistance R–2. This relay coil then actuates the relay contacts $b$–1 to open the line 17′ containing the heating coil 17 thereby removing the coil from the circuit and preventing over-heating. At the same time relay contacts $b$–2 at the center lower portion of the Y section are closed by relay $b$ to energize relay coil $c$ through conductor 57, voltage dropping resistance R–3, conductor 58, and thermal contacts $e$–1 which are normally closed. Energization of relay coil $c$ closes its relay contacts $c$–2 to lock itself in energized condition through lead 59, lead 61, and the normally closed thermal contacts $e$–1, the relay contacts $a$–3 being now in open condition.

Relay coil $d$ is also energized upon the closing of relay contacts $b$–2, through conductor 62, voltage dropping resistance R–4, line 64, rectifier D–3, line 58, contacts $b$–2, and thermal contacts $e$–1. The rectifier D–3 acts as a check valve preventing relay coil $c$ from being energized through lead 63 when relay contacts $a$–3 and thermal contacts $e$–1 are open, the relay contacts $d$–4 in 63 being closed by energization of coil $d$ to lock itself in through conductor 63. This relay $d$ also opens relay contacts $d$–2 in line 45 removing voltage from the pyrometer PY coil 43. Relay contacts $d$–1 are simultaneously opened to de-energize relay coil $a$ in lead 41 at the upper portion of the Y section of the circuit. De-energization of relay coil $a$ closes relay contacts $a$–1 placing the tool in condition for operation upon manual closing of the switch S–2 as shown in the X section of the circuit. De-energization of this relay $a$ also closes relay contacts $a$–3 and opens relay contacts $a$–2 so that these contacts assume the positions as shown in solid line in Figure 3.

At this time it is to be noted that the relay coil $d$ at the bottom of the Y section of the circuit closes the relay contacts $d$–3 in line 54 to light the pilot light P–2 through the heater $h$ in thermal control $e$, the relay contacts $a$–2 now being open. This pilot light P–2 visually signals the operator that the heat is proper in tool heating coil 17 and that the tool may be operated at any time by depressing the manual switch S–2 on the tool.

The circuit described thus far provides for a proper heating of the coil 17 on the tool before the tool can be operated.

When it is desired to make a dimple, the operator simply depresses the switch S–2. Closing of this switch starts the timing motor T–1 through conductors 24 and 25. This timing motor is arranged to close switch S–3 after a given period of time. Closing of the manual switch S–2 also energizes the solenoid operated valve Sol–2 through conductors 24, 27, return lead 37, and normally closed switch S–4. Energization of Sol–2 places the conduit 30 in communication with the conduit 34 and conduit 35 to the tool permitting compressed air from the air supply 28 to pass through conduits 29, 30, 34 and 35 to the tool. The pressure of this air is accurately regulated by the regulator 31 and indicated by the gauge 32 in the line 30. Sol–1 is normally closed whereby the air must follow the above described paths.

The regulated pressure is not so great as to cause a bending of the sheet metal by the tool, but just sufficient to insure a good contact between the member 14 and the sheet metal 10 as at 18 as shown in Figure 1. The heating coil 17 thus heats the metal 10 by conduction through the member 14 and contacting surfaces 18. The length of time for heating, referred to herein as the "dwell" time, is determined by the timing motor T–1.

After this given "dwell" time has elapsed, the timing motor T–1 closes the switch S–3 as shown in Figure 3 to cause energization of the solenoid operated valve Sol–1 through conductor 24, switch S–3, branch conductor 26, and return lead 37 to the right power line 23 through the switch S–4. Sol–1 is thus opened to bypass the regulator 31 and pass a much greater air pressure from source 28. This air pressure is applied to the tool through line 35 and is prevented from backing up through the still open Sol–2 valve and line 30 by the check valve 33. The greatly increased air pressure serves to effect the dimpling operation.

It will be noted that upon the closing of switch S–3 to energize Sol–1, the timing motor T–2 is simultaneously connected across the power lines by conductors 24 and 25. This timing motor T–2 has a relatively short period of from anywhere from one sixtieth to three seconds and times the period that the die members 11 and 14 remain in the position shown in Figure 2. It is important that the increased dimpling pressure be applied and maintained for a given period to insure that the dimple will "set."

After this given period, timing motor T–2 will open switch S–4 to break the return lead 37 from Sol–1 and Sol–2 de-energizing these valves. Sol–1 thus closes and Sol–2 disconnects conduit 30 from 34 and connects 34 to the exhaust vent 36. The tension spring 21 in Figures 1 and 2 may then return the member 11 to its separated position, the compressed air in cylinder 20 backtracking through conduits 35 and 34 out the exhaust vent 36.

When the operator releases the manual switch S–2, the tool circuit is opened and the timing motors T-1 and T-2 are caused to return to their inoperative conditions ready for another cycle. S-3 is thus opened and S-4 is closed. The tool is now ready to be moved to a new location and effect another dimple.

Referring to Figure 4 there is shown an alternative type of timing circuit which may be substituted for the compressed air control circuit enclosed in the dashed line and labeled TC in Figure 3. In Figure 4 the same reference numerals are used to designate the corresponding elements shown in Figure 3. As shown, the leads 24, 26, 27, 37, and 25 are the same as well as the timing motor T-1 and switch S-3. Instead of the timing motor T-2 which determines the time the die members of the dimpling apparatus are engaging the metal sheet to form the dimple, there is provided a thyratron electronic timer which serves to operate a relay contact F-1 in line 37 which relay contact replaces the switch S-4 of the TC circuit in Figure 3.

This actuation is accomplished by means of a relay coil g connected between the conductors 24 and 37—64 which is energized by closing of the switch S-3 upon termination of the "dwell" time. Energization of relay coil g closes relay contacts g-7 to place the condenser Co-7 across a source of voltage delivered to the terminals A and B. Charging of condenser Co-7 takes place through resistance R-10 and variable resistance R-9, resistance R-7, and relay contacts g-7. The terminals A and B are connected to the corresponding terminals A and B shown in Figure 3 across the rectifier D-1 in the upper right hand portion of section Y. The voltage between A and B is also employed for supplying plate voltage to a thyratron tube V through the medium of relay coil f and conductor 68.

The "start" electrode of the thyratron tube V is connected to one side of the condenser Co-7 through a resistance R-6, the other side of Co-7 connecting to the cathode of tube V. A high plate resistance R-8 is connected between the cathode and plate of the tube as shown.

With this arrangement, plate current will not flow through the relay coil f and lead 68 until the tube V "fires." Firing of this tube will not take place until the "start" voltage appearing across condenser Co-7 attains a certain value. The time at which the tube V will "fire" is thus determined by the time-constant of the condenser Co-7 and resistors R-10 and R-9, the latter of which is variable to permit adjustment of this time constant. Accordingly, only a predetermined time after the closing of relay contacts g-7 will the tube "fire." Upon discharge of tube V, current through the plate circuit of the tube will energize relay coil f to open the relay contacts f-1 between conductors 37 and 64 thus opening the return lead from the valve solenoids to release the compressed air pressure as described in Figure 3. The time constant of the circuit may be adjusted to any value, for example, between one sixtieth and three seconds.

It is thus seen that the timing motor T-2 of Figure 3 finds its equivalent in the time constant circuit comprising condensor Co-7 and resistances R-9 and R-10 of Figure 4, while the switch S-4 of Figure 3 finds its equivalent in the relay operated contacts f-1 of Figure 4.

Thus far the described system has related to the automatic controlling of the proper heating, dwell time, dimpling time, and actual dimpling. The remaining components of the circuit in combination with certain elements already discussed are provided for accurately regulating the temperature of the heating coil 17 to insure that it remains within close temperature limits, and for rendering the tool and heater inoperative in the event of a breakdown.

*Temperature regulation*

The temperature control and regulation is achieved in part by means of the pyrometer coils 43 and 44 and the shunting thermocouple TH in the Y section of the circuit. The voltage across pyrometer coil 43 applied through leads 42, 45, resistance R-11 and variable resistance R-12 tends to "up-scale" the pyrometer slightly ahead of the actual temperature. Therefore, the heater coil 17 current will be shut off by closing of the H-1 contacts to energize relay ba and open contacts b-1, just before the heater has reached its maximum temperature, giving the heating coil 17 a chance to stabilize before current is again applied to it. This voltage across the pyrometer coil for "up-scaling" the pyrometer needle N may be controlled by the variable resistance R-12 and thus the time the current is shut off from the coil 17 may be accurately adjusted.

The given maximum temperature to which the heating coil 17 will be raised is accordingly controlled by the pyrometer high limit contacts H-L and thermocouple TH. It will be recalled that the "dwell" period was initiated by de-energization of relay coil a by opening of relay contacts d-1 in line 41, the de-energization of relay coil a permitting relay contacts a-1 to close and connect the tool into the circuit. At this time the relay contacts d-2 were also opened removing the above mentioned "up-scaling" voltage from across the pyrometer coil 43. This removal of the voltage across pyrometer coil 43 is an important feature of the invention in that it permits normal calibration to be restored to the pyrometer.

The interrupter motor M includes a series of cams which periodically open the interrupter switches 47 and 49 to permit the pyrometer contacts to be periodically opened. The duration of opening the normally closed interrupter switches however is just sufficient to permit the pyrometer contacts to open but not so long as to exceed the time-constants of the condensers Co-1 and Co-2 shunting the relay coils a and b respectively, thereby allowing the relay contacts a-1 and b-1 to be energized or opened. In other words, the momentary opening of the interrupter switches will not affect the relay coils a and b, in view of their shunt condensers. Opening of the H-L contacts periodically by the interrupter motor "unlocks" the contacts by momentarily removing the line voltage from the pyrometer coil permitting the needle N to fall off and close the L-L contacts in the event the thermocouple or heater break.

Thus, if the temperature of the heater coil 17 begins to fall below the prescribed amount due to the opening of relay contacts b-1 in response to the closing of the high limit contacts H-L, opening of the interrupter switch 47 will open these high limit contacts, which contacts will not again close since the heater coil and thermocouple are below the high limit setting. Thus, after the charge on Co-2 has dissipated through relay coil b, this relay coil will be de-energized permitting the relay contacts b-1 to close and restore heater current to the heater coil 17. When the heater has almost reached its given temperature again, the thermocouple will close the high limit contacts H-L, again energizing relay coils b to open contacts b-1 and remove the heating current to coil 17. The cycle thus repeats and the temperature of the coil 17 is carefully maintained.

*Breakdown protection*

The element most likely to break down is the controlling thermocouple TH. This element, as already pointed out, is normally located in the tool and as the tool is moved from place to place it is not infrequent that the thermocouple leads as well as the thermocouple element itself become inoperative.

In order to prevent the dimpling operation in the event the thermocouple TH breaks, or in the event the heater coil 17 fails to recover, the pyrometer moving element falls back to the low-limit contacts L-L to close these contacts. Closing of contacts L-L energizes relay coil a through conductor 42, pyrometer coil 44, conductor 48, contacts L-L interrupter switch 49, conductor 41, voltage dropping resistance R-1, and rectifier D-1, it being remembered that relay contacts d-1 are opened. Energization of relay coil a opens relay contacts a-1 to disconnect the tool from the circuit. Also relay contacts a–2 are closed to shunt out the pilot light P–2, the turning off of this light indicating that the tool is not in operative condition. Relay contacts a–3 are simultaneously opened.

It is also to be noted that closing of relay contacts a–2 permits energization of the thermal heater h to commence. This heater has a sufficient time lag as not to affect the thermal contacts e–1 until the heater coil 17 has recovered. However, in the event that the thermocouple TH is broken, then thermal heater h will eventually cause the thermal contacts e–1 to open. Opening of thermal contacts e–1 thus de-energizes relay coil c permitting the closing of relay contacts c–1 in the conductor 56 adjacent the thermal control e. Closing of contacts c–1 by-passes the pyrometer coil 44 and high limit contacts H-L through conductors 54, 56, 46, coil b, and resistance R–2, the relay contacts d–3 being still closed. Current through relay coil b locks this relay in energized condition to maintain relay contacts b–1 open and insure that the heater coil 17 is not energized. Simultaneously with the opening of the thermal contacts e–1, the pilot light P–3 is energized indicating to the operator that trouble is present. At this point, normal operation can only be restored by turning off the main power switch S–1 and replacing the defective heater coil 17 or thermocouple. Closing again of S–1 will then place the circuit in condition for normal operation.

It should be noted that the low limit contacts are closed when the tool is started. Should the thermocouple TH be broken at this time, the upscaling voltage delivered through contacts d–2 which are closed at the start, will "upscale" the pyrometer. However, removal of this voltage by opening d–2 immediately permits the needle to fall back to close the L-L contacts and start the train of sequences outlined above.

It is thus seen that this described circuit will prevent operation of the tool unless the heater coil 17 is at proper temperature and unless the thermocouple TH is in operative condition.

Figure 5 discloses a preferred arrangement of the control circuit panel, the various pilot lights, main power switch S–1, pyrometer indicator, pressure regulator, and pressure gauge, and time setting means for the timing motors T–1 and T–2, being shown and designated by the same symbols identifying these elements in the other drawings.

Various control circuit variations within the spirit of the present invention will occur to those skilled in the art. The invention is therefore not to be thought of as limited to the particular embodiment disclosed.

I claim:

1. In a tool for forming sheet metal including a source of electrical energy connected to a heater to raise said metal to a predetermined temperature and connected to an actuating means for operating the tool to form the metal after said predetermined temperature has been attained, a control circuit comprising in combination: means for rendering said actuating means inoperative until said predetermined temperature is reached; temperature regulating means for indicating and maintaining said predetermined temperature once it has been reached; means responsive to said regulating means for disconnecting the actuating means from said source in the event said predetermined temperature is not maintained; and means for disconnecting said heater from said source after a given time interval, responsive to said last named means.

2. The subject matter of claim 1, in which said means for rendering the actuating means inoperative until the predetermined temperature is reached comprises: a first relay adapted to disconnect the actuating means from the source upon energization; and a second relay having normally closed contacts in series with the first relay and said source maintaining the first relay energized.

3. The subject matter of claim 2, including means for energizing the second relay to open said normally closed contacts only when said predetermined temperature has been reached, and self-locking means for maintaining the second relay energized.

4. The subject matter of claim 3, including means for connecting a visual indicator to said source in response to energization of said second relay, whereby an operator is signalled when the heater has attained the predetermined temperature.

5. The subject of claim 4, in which said visual indicator is extinguished upon energization of said first relay.

6. The subject matter of claim 1, in which said temperature regulating means comprises: a thermocouple disposed adjacent said heater; a pyrometer having a torque coil and low and high limit contacts; means connecting the pyrometer to the thermocouple; a variable resistance in series with the torque coil and said source; normally closed relay contacts in series with said variable resistance; and a relay coil for opening the contacts in response to closing of the pyrometer high limit contacts upon attainment of said predetermined temperature, whereby voltage across the torque coil through the variable resistance and relay contacts tends to up-scale the pyrometer ahead of the thermocouple until the high limit contacts close at which time said voltage is removed by opening of said contacts, restoring the pyrometer to normal calibration.

7. The subject matter of claim 1, in which said means responsive to said regulating means for disconnecting the actuating means from the source in the event said predetermined temperature is not maintained, comprises: a first relay adapted to disconnect the actuating means from the source upon energization; a thermocouple disposed adjacent said heater; a pyrometer having a torque coil and low and high limit contacts; means connecting the pyrometer to the thermocouple; conductor means connecting the low limit pyrometer contacts with said first relay, whereby closing of the low limit pyrometer contacts in response to a drop in the predetermined temperature energizes said first relay.

8. The subject matter of claim 7, in which said means for disconnecting said heater from the source after a given time interval in the event of breakage of the thermocouple or heater, comprises: a thermal control; relay contacts in series with the thermal control adapted to connect the thermal control to said source upon energization of said first relay; normally closed thermal contacts adjacent to and controlled by the thermal control to open after said given time interval; relay contacts in series with said heater and source; and means responsive to opening of said thermal contacts for opening said latter mentioned relay contacts in series with the heater, whereby the heater is disconnected.

9. The subject matter of claim 8, in which said means responsive to the opening of the thermal contacts comprises: a relay coil for opening the latter mentioned relay contacts upon energization; further normally closed relay contacts connected between said relay coil and said source; a further relay coil in series with said thermal contacts and adapted to close said further relay contacts upon opening of the thermal contacts.

10. The subject matter of claim 9, including means responsive to the opening of the thermal contacts for visually indicating disconnection of the heater.

References Cited in the file of this patent

UNITED STATES PATENTS 2,372,516    Rechton et al. _____ Mar. 27, 1945